Dec. 1, 1942.        B. J. SMITH        2,303,768
APPARATUS FOR EXTRACTING FRUIT JUCIES
Filed May 6, 1940
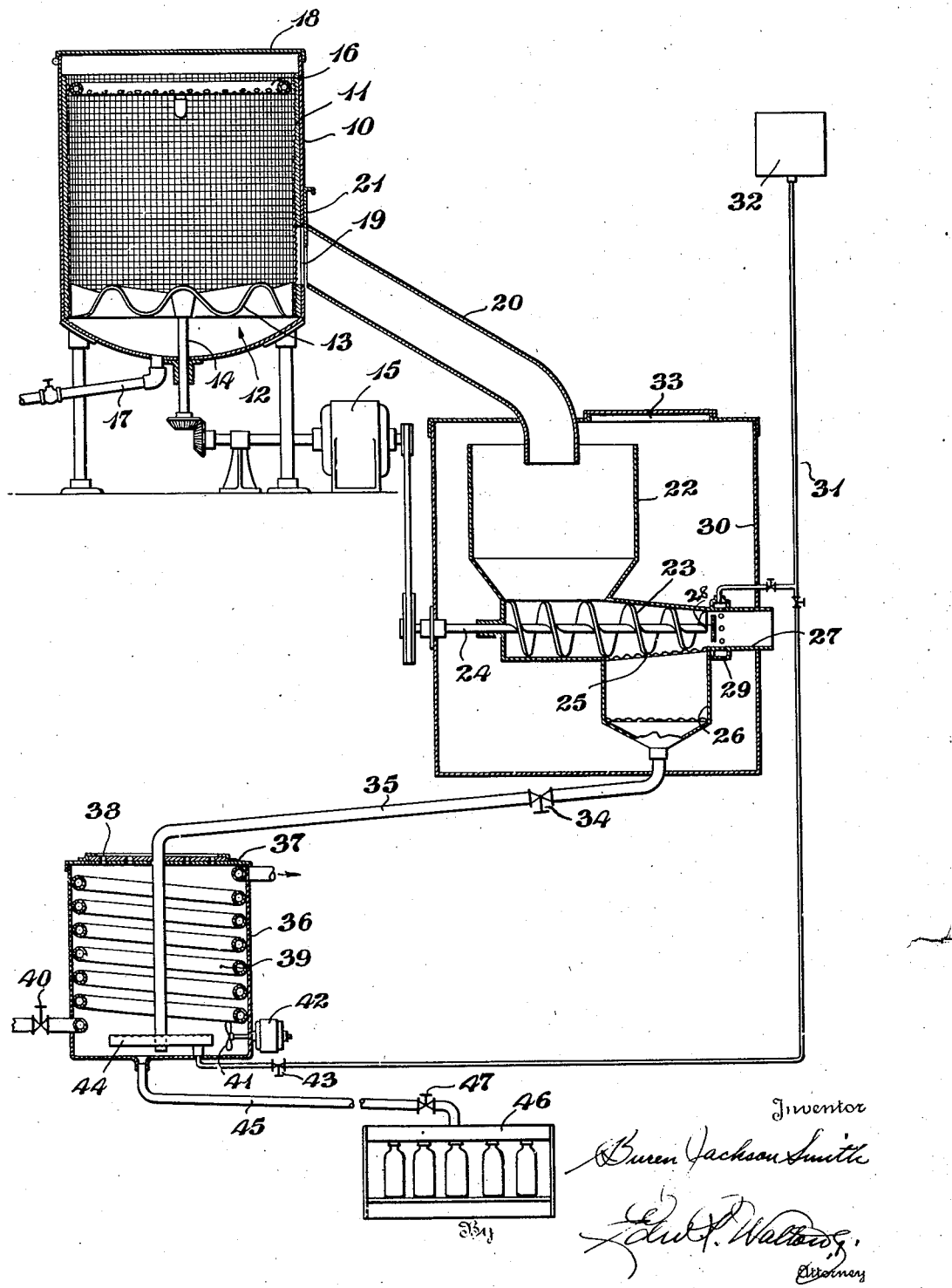

Patented Dec. 1, 1942

2,303,768

UNITED STATES PATENT OFFICE 2,303,768

APPARATUS FOR EXTRACTING FRUIT JUICES

Buren Jackson Smith, Washington, D. C.

Application May 6, 1940, Serial No. 333,693

1 Claim. (Cl. 146—3)

The present invention relates to an apparatus for obtaining and treating fruit juices.

It is well known that care must be exercised in the production of fruit juices: (1) to prevent bacteria and fungus spores from being entrained in the extracted juice whether they are normally on the skin of the fruit or result from handling; (2) to avoid exposure of the juice to atmospheric air which causes an oxidation in the juice which has a marked deteriorating effect upon the juice, both in taste, color and food value; and (3) to prevent inclusion in the juice of the oily and waxy substances in the skin of the fruit, particularly of citrus fruit, which imparts an undesirable taste to the juice and has other deleterious action thereupon.

The object of the present invention is to provide an apparatus for processing the fruit, particularly citrus fruit, in such a manner as will avoid the consequences, at least to a practically negligible degree, which are occasioned by the three facts above mentioned in the production of juice or in the preparation of a beverage made from the juice of fruit; and, at the same time, permitting such processing economically on a relatively small scale, i. e. a scale for local distribution.

A feature of the invention resides in combining, in a novel manner and into a single apparatus, instrumentalities for performing the juice extracting step in a sterile and non-oxidizing atmosphere to minimize the effect of air on the crushed fruit and its juice.

All of the above objects and features will now be more particularly described.

In some prior processes the skin or rind of the fruit has been sterilized prior to further processing. Sterilization consists in subjecting the fruit to a heated bath usually containing some chemical ingredient. This sterilization by heat has a deleterious effect upon the fruit due to the fact that in most instances the fruit has been subjected to at least two heat treatments, usually consisting first in washing the fruit in a heated bath and then subjecting the orange to a heated waxing process prior to the time the fruit is shipped for open market; and, in some instances, has also been subjected to a heated coloring bath. Consequently, additional heat treatments in juice extracting processes are, to say the least, not advantageous especially when the fruit is from three to four weeks old, or more, after being picked. Furthermore, in processing such sterilized fruit, the whole fruit is either cut or sliced and subjected to juice extracting steps, where the rind as well as the juice sacs are crushed or each fruit is peeled by hand, removing not only the outer oil and wax carrying portions of the skin but the inner albedo fibrous portions, totally baring the juice carrying sacs, which peeling method subjects the juice carrying sacs to contamination.

The present invention consists of an apparatus of novel combination for first removing simultaneously from a batch of whole citrus fruit its outer portion containing the wax and oils of the fruit while subjecting the fruit to the action of a water spray at ordinary atmospheric temperatures, thus leaving each fruit enclosed or encased by the albedo portion and without disturbing the juice containing sacs. The fruit is then subjected to a masticator in a sterile non-oxidizing atmosphere and which masticator liberates the juices in the interior juice containing sacs as well as certain constituents as may be contained in the albedo. The juice, thus liberated, is conducted to a chamber where it is cooled below 50° F., preferably between 35° and 40° F., and while being so cooled it is subjected to agitation while having a non-oxidizing gas forced through the liquid contents to saturate the same.

The accompanying drawing illustrates diagrammatically, by way of example, one type of apparatus which may be employed in practicing the present invention.

In the drawing, 10 denotes a vertical cylindrical container having a removable inner side wall lining 11 whose inner face is suitably roughened or coated to present a rasp-like surface. The bottom of the container is dished or concave to provide a suitable sump 12. Above this sump is provided a horizontally extending false bottom or platform 13 to support the fruit and which is waved or corrugated to provide an agitator for tumbling or moving the fruit against the roughened surface of the lining 11, when the platform 13 is rotated by the shaft 14 driven from the motor 15. This agitation or movement of the fruit against the roughened surface of the lining 11 abrades the outer surface of the fruit with a rasp-like action as each fruit comes in contact therewith a multiplicity of times to remove therefrom its outer cuticle which bears the waxy coating and contains the oil sacs of the skin or rind, but leaves the albedo membrane completely surrounding and encasing the interior juice sacs. In practical operation the outer wax and oily portion of the skin or rind from one box of oranges is removed in about 30 to 45 seconds with the speed of rotation of the platform 13 at about 300 R. P. M.

Within the container 10 and at the top portion thereof a spraying device 16 plays a stream of water on the fruit, while being subjected to this abrasive action, and thus cleanses the fruit and the roughened surface of the lining 11 by washing off the removed particles and allowing them to flow into the sump 12 where they are drained off by the drain pipe 17. The upper end of the container 10 may be closed by a cover 18. A discharge opening 19 is provided in the side wall of the container 10 and lining 11 and through which opening the fruit may be discharged by the rotation of the platform 13 into a chute 20 delivering the fruit to the crushing device. The discharge opening 19 may be opened and closed by a suitable closure 21.

The crushing device masticator may comprise a hopper 22 into which the tubular chute 20 discharges. A crushing auger 23 is disposed at the bottom of the hopper 22 and is driven by shaft 24 belted to the motor 15. The lower side of the casing surrounding the auger has its underside provided with a juice discharging opening 25, which may be a series of small perforated openings, or a large screen covered opening, as desired, the juice falling through the opening 25 to a collecting and straining chamber 26. Coaxial with the auger is a discharge opening 27 for emitting the pulp residue from which the juice has been liberated. This opening may be provided with a restricting means 28, usually of an adjustable and yieldable character, for resisting the free passage of the solid bulky material through the opening 27 and functioning to cooperate with the auger to crush and extract the juices from the fruit. This opening 27 discharges, preferably, into the atmosphere and in order to prevent the admission of air into the crusher, a curtain of non-oxidizing gas preferably, carbon dioxide is sprayed across the opening by means of a manifold 29 connected with the gas supply 32. Because of its heavier specific gravity the curtain of non-oxidizing gas will exclude the flow of air into the crusher.

The hopper 22 and masticator 23 are contained in a closed chamber 30 which is supplied with the non-oxidizing gas through a pipe 31 connected to a suitable source of supply 32. A suitable manhole 33 is provided in the container for access to the parts. The gas in the chamber 30 will rise into the tubular chute 20 and will also fill the hopper and auger and, consequently, become commingled with the juice extracted.

From the collection chamber 26 juice may be permitted to flow, by control of the valve 34, through pipe 35 into a cooling chamber 36, the pipe 35 preferably extending to a point adjacent the bottom of the cooling chamber so as to minimize entrainment of air into the juice as it flows into the chamber 36. The chamber 36 is provided with a movable cover 37 which may have controllable vent openings 38. A cooling coil 39 is arranged preferably within the chamber 36 and the flow of the cooling medium through the coil may be controlled through a valve 40. At a suitable point near the bottom of the cooling chamber 36 is an agitator 41 driven by any suitable means, such as a motor 42, to stir the liquid in the chamber. When the chamber becomes filled, or sufficiently filled as desired, the agitator 41 is started and the valve 43 controlling the non-oxidizing gas supply is opened so as to permit said gas to flow through a jet or jets 44 in the bottom of the container. Thus, while the liquid is being cooled and agitated, the non-oxidizing gas is being forced through the liquid to saturate the same. The liquid is preferably cooled to a point between 35° and 40° F. and because of the heavier specific gravity of the non-oxidizing gas, all air will be forced to the top of the container and may be vented through the openings 38. When the vents 38 are closed an equilibrium between the non-oxidizing gas in the container and the exterior atmospheric air will be obtained, thus excluding air from the chamber. A drain pipe 45 extends from the bottom of the chamber 36 to a bottle or packing station 46 to which the flow of the juice may be controlled by a valve 47.

As the contents of the chamber 36 flows to the packing station 46, the temperature will rise, allowing a substantial quantity of the non-oxidizing gas to escape during the bottling operation. However, a comparatively small quantity of the non-oxidizing gas will be in the packaged liquid and will act to preserve the same. The present bottling station is one now employed for distribution or sale, but may be of a character for canning the juice.

What is claimed is:

An apparatus for extracting citrus fruit juices and which comprises, in combination, a cylindrical container having a rotatable bottom and relatively stationary inner abrasive side wall surfaces whereby the wax and oil cell containing cuticle of the fruit rind may be removed while leaving the albedo unpunctured or unbroken and enclosing the fruit, water spraying means in the container for spraying the fruit subjected to the abrasive action of said abrasive surfaces, means for drawing-off from the container the removed cuticle with said spray-water, a hopper, said container having a controllable discharge means through which said abraded fruit is discharged therefrom into said hopper by centrifugal movement imparted thereto by said rotary bottom, a crusher chamber arranged to receive fruit fed from said hopper and having a restricted open end portion from which the compressed fruit pulp is discharged and a foraminous lower wall, a conveying auger in said extracting chamber for feeding the fruit in said hopper toward the restricted open end of said chamber, whereby the fruit is compressed by the operation of said auger for extracting the juice therefrom, means for collecting and receiving the extracted juice passing through said foraminous wall, means for closing the apparatus to the admission of air when in the operation, including a source of non-oxidizing gas and means connected with said gas source and disposed within the pulp discharge opening of said chamber establishing a curtain of said non-oxidizing gas thereacross to exclude the admission of air therein and for supplying said gas into said apparatus, and means for actuating said rotatable bottom and said auger.

BUREN JACKSON SMITH.